United States Patent
Psaroudakis et al.

(10) Patent No.: US 12,282,486 B2
(45) Date of Patent: Apr. 22, 2025

(54) ADDRESS MATCHING FROM SINGLE STRING TO ADDRESS MATCHING SCORE

(71) Applicant: ORACLE INTERNATIONAL CORPORATION, Redwood Shores, CA (US)

(72) Inventors: Iraklis Psaroudakis, Zurich (CH); Giulia Carocari, Redwood Shores, CA (US); Andrea Ziani, Redwood Shores, CA (US); Miroslav Cepek, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 130 days.

(21) Appl. No.: 17/733,011

(22) Filed: Apr. 29, 2022

(65) Prior Publication Data
US 2023/0350903 A1 Nov. 2, 2023

(51) Int. Cl.
*G06F 16/2457* (2019.01)
*G06F 16/2458* (2019.01)
(Continued)

(52) U.S. Cl.
CPC .... *G06F 16/24578* (2019.01); *G06F 16/2468* (2019.01); *G06F 16/29* (2019.01); *G06N 3/08* (2013.01); *G06N 3/105* (2013.01)

(58) Field of Classification Search
CPC ........... G06F 16/24578; G06F 16/2468; G06F 16/29; G06N 3/08; G06N 3/105; G06N 5/048; G06N 5/01; G06N 20/20
See application file for complete search history.

(56) References Cited

U.S. PATENT DOCUMENTS

| | | | |
|---|---|---|---|
| 7,376,636 B1 * | 5/2008 | Wang | G06F 16/29 707/999.102 |
| 7,627,550 B1 | 12/2009 | Adams et al. | |

(Continued)

FOREIGN PATENT DOCUMENTS

CN 108804398 A * 11/2018

OTHER PUBLICATIONS

Rossetti, Kyle et al., Medium, "Basics of Entity Resolution with Python and Dedupe", Jan. 3, 2018, available: https://medium.com/district-data-labs/basics-of-entity-resolution-with-python-and-dedupe-bc87440b64d4.

(Continued)

*Primary Examiner* — Apu M Mofiz
*Assistant Examiner* — Oscar Wehovz
(74) *Attorney, Agent, or Firm* — Hickman Becker Bingham Ledesma LLP (57) ABSTRACT

Techniques are described herein for address matching from a single address string to an address matching score. In an embodiment, an address string is received and parsed into parsed address data. Once an address string is parsed into parsed address data, the parsed address data is standardized by converting the parsed address data into a standard format and replacing abbreviations, colloquial names with formal names. Once an address string has been standardized into a standardized street locale, candidate addresses that are identical to or similar to the standardized street locale are identified and are assigned a score. Each score comprises a probability that the respective candidate address and the standardized street locale represent a same place or location.

20 Claims, 5 Drawing Sheets

FIG. 2

(51) Int. Cl.
  *G06F 16/29* (2019.01)
  *G06N 3/08* (2023.01)
  *G06N 3/10* (2006.01)

(56) References Cited

U.S. PATENT DOCUMENTS

| | | | |
|---|---|---|---|
| 8,423,563 | B2 | 4/2013 | McPeake et al. |
| 10,275,450 | B2 | 4/2019 | Diwan et al. |
| 10,726,028 | B2 | 7/2020 | Sun |
| 11,042,555 | B1 | 6/2021 | Kane et al. |
| 11,182,395 | B2 | 11/2021 | Mirylenka et al. |
| 2010/0106724 | A1* | 4/2010 | Anderson ............ G06F 16/285 707/E17.046 |
| 2012/0278263 | A1* | 11/2012 | Borthwick ............ G06N 20/00 706/12 |
| 2012/0323877 | A1 | 12/2012 | Ray et al. |
| 2014/0156263 | A1 | 6/2014 | Patman Maguire |
| 2014/0280160 | A1* | 9/2014 | Scriffignano ............ G06F 16/29 707/737 |
| 2018/0137150 | A1 | 5/2018 | Osesina et al. |
| 2019/0114372 | A1 | 4/2019 | Southgate |
| 2019/0155916 | A1 | 5/2019 | Huang et al. |
| 2019/0251122 | A1* | 8/2019 | Rivas ............... G06F 16/24578 |
| 2020/0210466 | A1 | 7/2020 | Yin et al. |
| 2021/0374479 | A1* | 12/2021 | Zambetti, Jr. ......... G06F 18/217 |
| 2022/0050824 | A1* | 2/2022 | Gartner ................ G06N 20/00 |

OTHER PUBLICATIONS

Oracle Corporation, "Oracle Fusion Middleware Understanding Oracle Enterprise Data Quality", 12c (12.2.1.3.0), Jul. 2018.

Office for National Statistics, "ONS working paper series No. 17—Using data science for the address matching service", 26 pages, retrieved May 24, 2022.

Barrentine, Al, Medium, "Statistical NLP on OpenStreetMap: Toward a machine-interpretable understanding of place", available: https://medium.com/@albarrentine/statistical-nlp-on-openstreetmap-b9d573e6cc86, 20 pages, retrieved May 24, 2022.

Barrentine, Al, Medium, "Statistical NLP on OpenStreetMap: Part 2: training Conditional Random Fields on 1 billion street addresses", available: https://medium.com/@albarrentine/statistical-nlp-on-openstreetmap-part-2-80405b988718, retrieved May 24, 2022.

Abid, Nosheen et al., "DeepParse: Trainable Postal Address Parser", School of Electrical Engineering and Computer Science (SEECS), 9 pages.

Elfeky, Mohamed G., et al., "TAILOR: a record linkage toolbox", Proceedings 18th Intl Conf on Data Engineering, pp. 17-28, doi: 10.1109/ICDE.2002.994694, 2002, 12pgs.

Conrad, Colin, et al., "ELM: An Extended Logic Matching Method on Record Linkage Analysis of Disparate Databases for Profiling Data Mining", 2016 IEEE 18th Conf on Business Informatics (CBI), pp. 1-6, doi: 10.1109/CBI.2016.9, 2016, 6pgs.

Bengston, Eric, et al., "Understanding the Value of Features for Coreference Resolution", Proceedings of the 2008 Conf on Empirical Methods in Natural Language Processing, pp. 294-303, 2008, 10pgs.

Mumcuyan, U.S. Appl. No. 16/989,306, filed Aug. 10, 2020, Non-Final Rejection, Nov. 20, 2023.

Mumcuyan, U.S. Appl. No. 16/989,306, filed Aug. 10, 2020, Notice of Allowance and Fees Due, Apr. 15, 2024.

\* cited by examiner

ADDRESS MATCHING FROM SINGLE STRING TO ADDRESS MATCHING SCORE

FIELD OF THE INVENTION

The present invention relates to address string matching techniques based on machine learning approaches and fuzzy matching.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The ability to decide whether two addresses can represent the same place is important in many systems. For example, in the financial crime and compliance domain, it is vital in identifying links and relationships between various entities. The address matching is a hard task as it involves a lot of variation in data—one address can be identified in many ways and involves many country-specific variations. For example, a place in Zurich, Switzerland, can be represented by the following addresses:

Hardstrasse 17554, 8005 Zürich, Switzerland
Hardstraße 17554, Curych, Švýcarsko
8005 Zürich, Hardstrasse 17554, Switzerland In addition, addresses that look very similar can easily represent different places. The street names, as well as city names, repeat for different places. For example, there is Prague in the Czech Republic and at least three Pragues in the United States. In addition, existing address matching techniques include numerous string comparisons and database lookups which make address matching computationally intensive and resource expensive. All of such factors make address matching a difficult problem. Thus, techniques are desired to parse addresses, standardize addresses, and accurately identify when addresses are matching more efficiently than previous techniques.

DETAILED DESCRIPTION

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for address matching from a single address string to an address matching score.

When an address formatted as an address string is received, the address string is parsed into address parts, specifically, is parsed into subfields represented by key-value pairs, where a key is a subfield name or tag such as "country" or "state". There are subfields for: "street level" information (i.e., words that identify a building, for example, street name, building number, postal box, building unit, etc.), "city level" information (i.e., words that identify a city), "postal code level" information (i.e., words that identify a postal code), "state level" information (i.e., words that identify a state or island), and "country level" information (i.e., words that identify a country or a country region).

A novel process referred to herein as street locale standardization finds matches to the non-street level fields to produce one or more standardized street locales, which do not include street level information. The matches are found using a multi-language database of global location information, referred to herein as a global toponym database. Each standardized street locale is a real location in which many real streets and street addresses exist, such as a city, town, or municipality. A score is generated for each standardized street locale. Based on the scoring, one or more standardized street locales are selected as best matches for the non-street level information.

For example, street locale standardization yields the following standardized street locales from the following query.

Query: Hardstr. 17554, 8005 Zürich
Standardized Street Locale: Zürich, Switzerland
Standardized Street Locale: Zurich, KS, USA The term street address refers to a string, substring, or set of subfields that contain only street level information. The query "Hardstr. 17554, 8005 Zürich" includes the street address "Hardstr. 17554". The standardized street locale "Zurich, KS, USA" does not include a street address.

The next phase of processing is based on the selected one or more standardized street locales. It is referred to herein as full address resolution because it provides matches and scores at both the street level and the non-street level. An address database is searched to find candidate addresses that exactly match a standardized street locale (e.g., match exactly Zürich) and that match on a fuzzy level on the street-level fields (e.g., similar to Hardstr. 17554). In effect, the search is limited to the street addresses that fall with any of the standardized street locales. A machine learning model is then applied to the street addresses of the candidate addresses to score them as a match.

Compared to existing techniques, techniques described herein generate highly accurate predictions that indicate whether two or more addresses represent the same place or location by performing fewer string comparisons and fewer database lookups than previous techniques. Thus, techniques discussed herein reduce storage, memory, and CPU processing needed to achieve similar results.

Address Parsing

As an initial step, an address formatted as an address string is received and parsed to generate parsed address data. Parsed address data may include "street level" information (i.e., words that identify a building, for example, street name, building number, postal box, building unit, etc.), "city level" information (i.e., words that identify a city), "postal code level" information (i.e., words that identify a postal code), "state level" information (i.e., words that identify a state or island), and "country level" information (i.e., words that identify a country or a country region).

TABLE 1, below, shows example address strings that are parsed into parsed address data.

TABLE 1

Address string parsed into parsed address data

| Address string | Street | City | State | Country | Postal Code |
|---|---|---|---|---|---|
| 118 Old town road, Bridgeport, USA | 118 Old town road | Bridgeport | | USA | |
| No. 60; Baihuazhou; Suzhou City; Jiangsu Province 210000; People's Republic of China | No. 60 Baihauzhou | Suzhou City | Jiangsu Province | People's Republic of China | 210000 |

Due to the fact that a single address can be identified in many ways and may involve many country specific variations, address parsing is extremely difficult to solve deterministically using approaches such as regular expressions. Such approaches may work reasonably well for a single particular country, as addresses may tend to be highly structured, but simply too many variations and ambiguities exist to make such approaches highly functional across multiple languages.

The initial address parsing step can be performed using any applicable address parsing method. In one embodiment, the address parsing step is performed according to flow 100 of FIG. 1.

Figure 1:
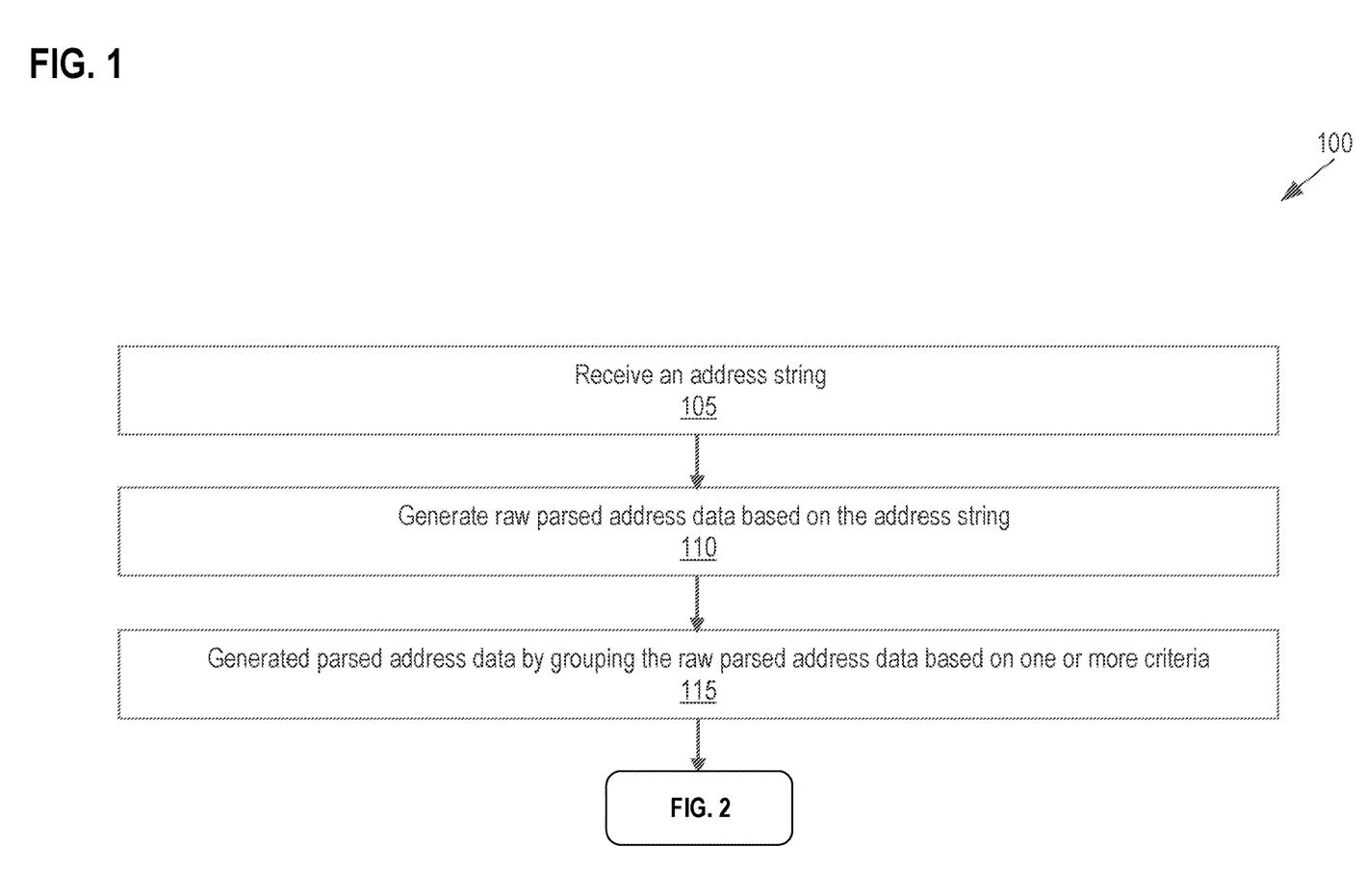
FIG. 1 shows an example procedure for parsing an address string.

In step 105, an address string is received as input.

In step 110, the address string is parsed to generate raw parsed address data. The raw parsed address data includes key-value pairs, each key-value pair comprising a distinct subfield tag and subfield value for the address string. Subfield tags may include tags such as house, category, near, house_number, road, unit, level, staircase, entrance, PO-box, postcode, suburb, city_district, city, island, state_district, state, country region, country, world_region.

A parser implementation that may be used is Libpostal. Libpostal is a library of software for parsing and segmenting into address parts multi-language strings that represent addresses around the world. Libpostal uses statistical Natural Language Processing and machine learning models.

In step 115, subfields of raw parsed address data may be consolidated based on one or more criteria to generate canonical address subfields. The one or more criteria may define canonical address subfields. For example, the one or more criteria may define five canonical address subfields having tags: "Street", "city", "postal code", "State", "Country", and may also define sets of subfields tags in the raw parsed address data that correspond to the canonical subfield tags:

Street: "house", "category", "near", "road", "level", "unit", "house_number", "staircase", "entrance", "po_box", "city_district", "suburb"
City: "city"
Postal code: "postcode"
State: "state", "island"
Country: "country", "country_region"

Depending on particular subfields in the raw parsed address data, it is possible canonical address subfields may contain the same subfields and subfield values as the raw parsed address data or that some of the subfields in the canonical address subfields are identical to those in the raw parsed address data, or that a subfield exists in the canonical address subfields and raw parsed address data but has different respective values.

Street Locale Standardization

Once the canonical address subfields are formed, street locale standardization is performed. Street locale standardization produces street locales that include only non-street level information, such as city, state, country, in a same canonical human language, such as English. Standardization may infer or derive missing non-street level subfields that were missing from canonical address subfields or raw parsed address data and/or for which there was no equivalent term in the original query. For example, street locale standardization may produce, from canonical address subfields generated for a French address query that does not include a country, English-value subfields that include a subfield for a country.

It is important that standardized street locales correspond to actual locales. This feature of street locale standardization is an assumption that underlies machine learning based address matching described below, and that contributes to the accuracy of machine learning address matching.

To perform street locale standardization, a global toponym database is used. The global toponym database maps consistent base name toponyms to alternative names, which can be alternatives in the same and/or different languages. The global toponym database also maps actual combinations of base names to IDS-3166-2 country codes (or the equivalent), for example, maps actual respective city, state, and countries to IDS-3166-2 country codes. The actual combinations are referred to herein as canonical street locales. In general, a standardized street locale is a canonical street locale.

The global toponym database may be derived from publicly available databases, such as GeoNames. For example, canonical street locales may be derived from GeoNames. In addition, indexes or other data structures are provided to enable efficient searching and matching for street locale standardization. Such data structures may also support the use of fuzzy matching.

Figure 2:
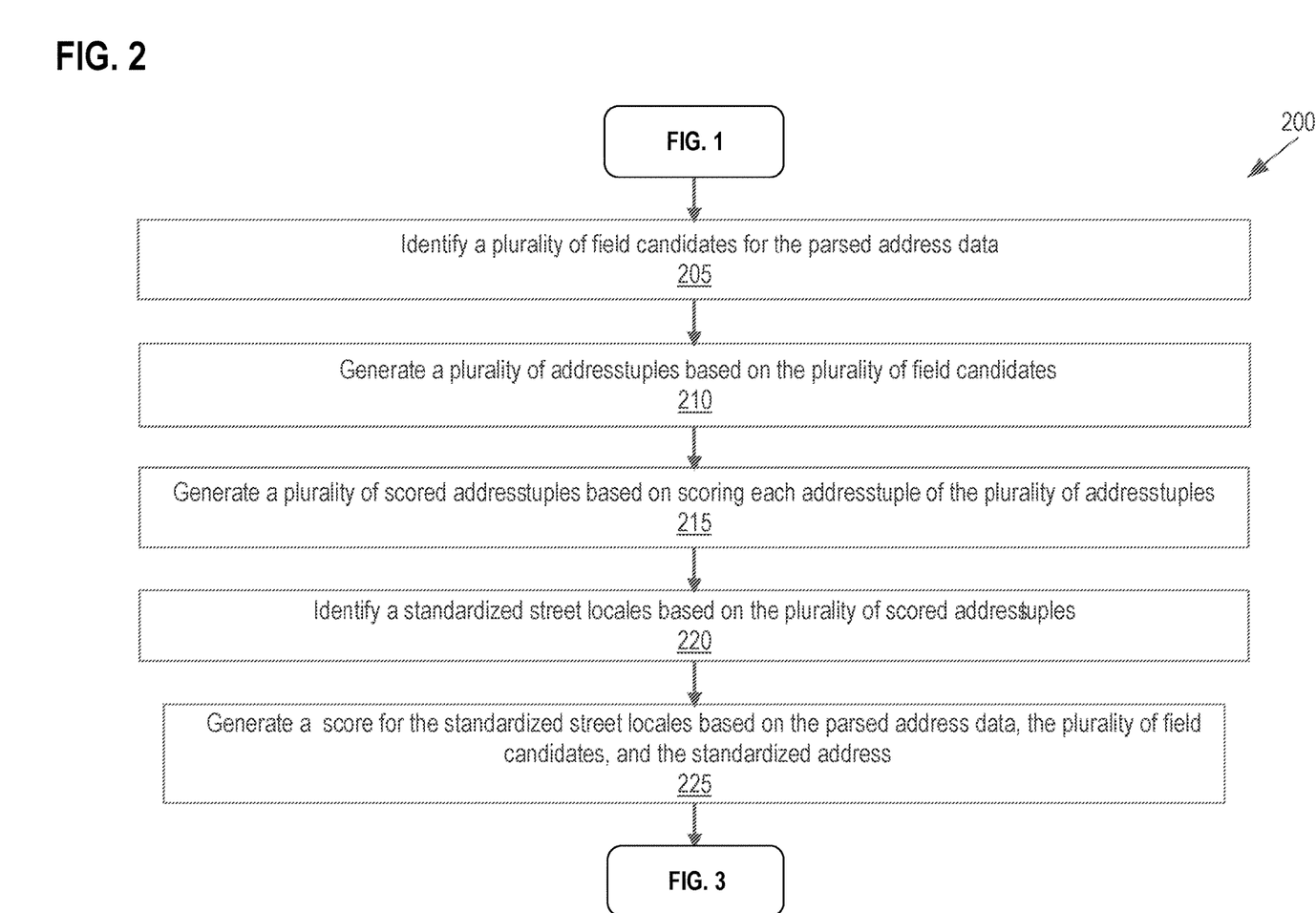
FIG. 2 shows an example procedure for forming standardized street locales.

Flow 200 of FIG. 2 shows an example procedure for street locale standardization. In some embodiments, flow 200 of FIG. 2 is a continuation of flow 100 of FIG. 1. The parsed address data generated by FIG. 1 is used as input to flow 200 of FIG. 2.

In step 205, a plurality of field candidates is identified for the canonical address subfields. This step includes performing lookups on subfield values of the canonical address subfields to retrieve matching base names. Each matching base name is referred to herein as a "field candidate".

As an example, for canonical address subfields that includes the following key-value pairs: Street:National Gallery Trafalgar Square", "City:londra", "Country:UK", "Postal Code:WC2N5DN", TABLE 2 shows a plurality of field candidates for the non-street level subfields that result from performing lookups for these non-street-level subfields against the global toponym database.

TABLE 2

Example field candidates

| Subfield | Name | Country code | Similarity score |
|---|---|---|---|
| country | United Kingdom | GB | 1.0 |
| city | London | GB | 1.0 |

TABLE 2-continued

Example field candidates

| Subfield | Name | Country code | Similarity score |
|---|---|---|---|
| city | Landon | GB | 0.85 |
| postal code | WC2N | GB | 0.95 |
| postal code | WC3N | GB | 0.75 |

TABLE 2 includes a single field candidate for the "country" subfield tag, two field candidates for the "city" subfield tag, and two field candidates for the postal code subfield tag. When the value "londra" from the key-value pair "City: londra" is looked up in the global toponym database, the possible base names "London" and "Landon" are retrieved as subfield candidates. As another example, when the value "WC2N5DN" from the key-value pair "Postal Code: WC2N5DN" is looked up in the global toponym database, the possible alternative subfield values "WC2N" and "WC3N" are retrieved as field candidates.

TABLE 2 also includes a "Similarity Score" column, which identifies a normalized similarity score for each field candidate of the plurality of field candidates. In one embodiment, each similarity score is generated by ElasticSearch, which generates an ElasticSearch score using a global toponym database as background data against which searches are made. Elasticsearch is an open source distributed search engine built on top of Apache Lucene that provides (near) real-time query and advanced analytics functionality.

In some embodiments, performing the base name lookup includes first retrieving all possible alternative subfield values for the subfield value corresponding to the "Country" subfield tag and then using the possible alternative subfield values for the subfield value corresponding to the "Country" subfield tag to restrict the search domain of the other fields to only values that exist within those specific countries.

In step 210, a plurality of address tuples is generated based on the plurality of field candidates. The plurality of address tuples is generated by creating all complete and partial (i.e., with empty fields) combinations of field candidates of the plurality of field candidates associated with a given Country code. TABLE 3 shows a plurality of address tuples generated based on the plurality of field candidates shown in TABLE 2.

TABLE 3

Example address tuples

| City | State | Country | Postal Code |
|---|---|---|---|
| London | | United Kingdom | WC2N |
| Landon | | United Kingdom | WC2N |
| London | | United Kingdom | WC3N |
| Landon | | United Kingdom | WC3N |
| London | | United Kingdom | |
| London | | United Kingdom | |
| | | United Kingdom | WC2N |
| | | United Kingdom | WC3N |

In step 215, a plurality of scored address tuples is generated based on scoring each address tuple of the plurality of address tuples. Each address tuple of the plurality of address tuples is assigned a score equal to a sum of normalized similarity scores of each subfield in the respective address tuple. TABLE 4 shows the plurality of address tuples from TABLE 3, each assigned with a score.

TABLE 4

Example scored address tuples

| City | State | Country | Postal Code | Score |
|---|---|---|---|---|
| London | | United Kingdom | WC2N | 2.95 |
| Landon | | United Kingdom | WC2N | 2.80 |
| London | | United Kingdom | WC3N | 2.70 |
| Landon | | United Kingdom | WC3N | 2.55 |
| London | | United Kingdom | | 2.00 |
| Landon | | United Kingdom | | 1.85 |
| | | United Kingdom | WC2N | 1.95 |
| | | United Kingdom | WC3N | 1.75 |

As an example of scoring the first address tuple in TABLE 4, as shown in TABLE 2, the field candidate "London" has a Similarity score of "1.0", the field candidate "United Kingdom" has a Similarity score of "1.0" and the field candidate "WC2N" has a similarity score of "0.95". The sum of these values is equal to a score of "2.95", which is assigned to the first address tuple as shown in TABLE 4.

In step 220, a standardized street locale is identified based on the plurality of scored address tuples. Specifically, one or more address matches are first identified based on the plurality of scored address tuples. This step includes performing an address lookup using the global toponym database to determine whether any of the plurality of scored address tuples are canonical street locales. Scored address tuples are looked up in the global toponym database according to their score until at least one match on a canonical street locale is identified. Higher ranking scored address tuples are looked up first, and scored address tuples with the same score are looked up at the same time.

In an embodiment, if a particular scored address tuple is looked up in the global toponym database and a match is found, then the scored address tuple is considered an canonical street locale match. If multiple address tuples that have the same score each have a match in the global toponym database, then a tiebreaker is used. A relevance score is generated for each of the multiple addresses, and the address with the highest relevance is considered the address match. Relevance may be determined based on a relevance metric such as the most populated place.

In some embodiments, if the postal code subfield value in the returned address is ambiguous (e.g., not uniquely determined by any of the looked up address tuples), the postal code subfield value is removed from the result. This detail ensures that the resulting standardized street locale is not incorrect.

In step 225, a standardized street locale score is generated for the standardized street locales based on the canonical address subfields, the plurality of field candidates, and the standardized street locale. The standardized street locale score comprises a confidence metric for the standardized street locale.

A standardized street locale score is generated by evaluating the canonical address subfields, the plurality of field candidates, and the standardized street locale against a set of criteria. TABLE 5 includes a set of criteria for generating a standardized street locale score.

TABLE 5

Example set of criteria

| Consolidated Input subfield | Standardized Output subfield | Used available field candidate? | Penalty function |
|---|---|---|---|
| Filled | Filled | No | 6 * inference_penalty (field) |
| Filled | Filled | Yes | candidate_penalty (score, field) |
| Filled | Empty | No candidates available | 4 (constant) |
| Filled | Empty | Candidates available | 2 (constant) |
| Empty | Filled | — | 4 * inference_penalty (field) |
| Empty | Empty | — | 1.0 |

The set of criteria shown in TABLE 5 is used to assign penalty values to each subfield. The set of criteria is evaluated for four different subfields from the canonical address subfields, the plurality of field candidates, and the standardized street locale: city, state, country, and postal code. The "Consolidated Input subfield" column represents whether a subfield from the canonical address subfields is filled or empty. The "Standardized Output subfield" column represents whether a subfield from the standardized street locale is filled or empty. The "Used available field candidate?" column represents whether a field candidate from the plurality of field candidates was available or if the field candidate was used.

The "Penalty function" column represents various penalty functions that are used to generate penalty values, where the candidate penalty and inference penalty are defined based on the subfield that is currently considered. The inference_penalty( ) function behaves as follows:

Inferring postal code from at least city and country returns a value of 1.0;

Inferring state from at least city and country or country and postal code returns a value of 0.5;

Inferring state or city from at least country and postal code returns a value of 0.75;

In all other cases (e.g., inferring country or inferring city when neither country and postal code are set), the return value is 4—the number of fields used for inference.

The candidate_penalty( ) function uses the similarity score value, which is the normalized similarity score of the field candidate used to standardize this subfield (it is e.g. the similarity score returned by an ElasticSearch query):

State and city: field score=sqrt(1/(similarity score));

Country: field score=1/(similarity score)^2;

Postal code: field score=1/(similarity score);

A confidence score for each standardized street locale is generated. The confidence score is (Number of subfields in standardized street locale)/(sum of respective scores of the subfields), e.g., 4/(sum of respective subfield scores of State, City, County, and Postal code).

As an example, the criteria shown in TABLE 5 is applied to the standardized street locales from the "Standardized street locale" column shown in TABLE 6 to generate the respective confidence metrics shown in the "Confidence" column.

TABLE 6

Example standardized street locale scores

| Parsed address | Standardized street locale | Confidence |
|---|---|---|
| scottsdale, az, united states of america, 85262 | Scottsdale, Arizona, United States, 85262 | 1.0000 |
| los altos hills, ca, united states of america, 94022 | Los Altos, California, United States, 94022 | 0.8066 |
| richmond, vt, united states of america, 23219 | Richmond, Virginia, United States, 23219 | 0.6666 |
| london,, united kingdom, w86lp | London, England, United Kingdom, EC1A | 0.4984 |
| hong,, kong, | Hongo, South Kivu Province, Congo, *** | 0.1129 |

In some embodiments, the confidence metric for a standardized street locale can be used to determine whether the provided information is reliable for exact matching on address subfields or if other matching methods should be used instead.

Full Address Resolution

Once one or more standardized street locales have been generated for an address string, full address resolution is performed. Full address resolution is based on the input street address, which is a consolidation of street-level fields of the canonical address subfields. In effect, the input street address represents the street address in the address query string. Full address resolution comprises two phases. First, candidate addresses are found by performing look ups against a global address database on combinations of the input address and the standardized street locales. Candidate addresses are full addresses that include a street address and non-street level information.

A global address database maps streets addresses to canonical street locales. The street addresses may include multi-lingual alternatives. An address mapping may be derived from GeoNames in combination with the global toponym database.

The global address database is used to find candidate addresses that exactly match both a standardized street locale and that match the input address based on degree of similarity, i.e., a fuzzy match. Some candidate addresses may be filtered out because of insufficient similarity and thus represent poor matches.

In a second phase of full address resolution, a final score is generated for each candidate address based on applying a machine learning model to a street address in the candidate addresses and the input address.

Figure 3:
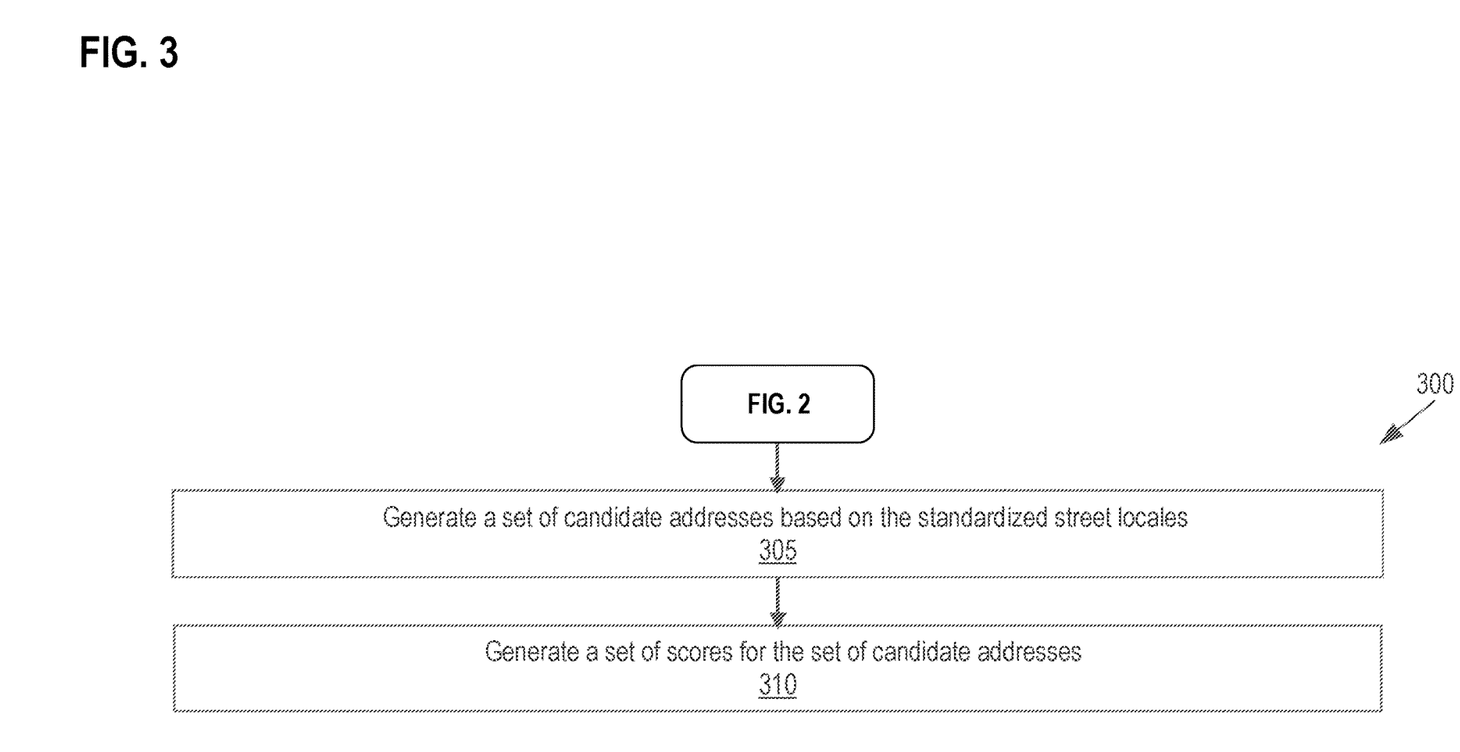
FIG. 3 shows an example procedure for machine learning based address matching.

FIG. 3 is a flow diagram for performing full address resolution. Referring to FIG. 3, in step 305, a set of candidate addresses is generated based on the global address database and standardized street locales. For example, a query is formulated based on the standardized street locale to: exactly match the country value specified in a standardized street locale, exactly match the city value specified in the standardized street locale, and fuzzy match the input address. The query is sent to a candidate finder system, which generates the set of candidate addresses. The candidate finder system can be any text query system, for example, Elastic Search using the global address database as the base data. Elastic Search may associate the candidate addresses with scores, which may be used to filter candidate addresses that are poor matches.

In step 310, a set of final scores is generated for the set of candidate addresses by applying a machine learning model.

Each candidate address of the set of candidate addresses is assigned a final score that comprises a probability that the respective candidate address represents a same place or location as the combination input street address and the respective standardized street locale portion of the candidate address. To generate the set of final scores, the street address of each candidate address and the input address is converted to a vector representing the difference between the respective street addresses. Each vector is constructed by calculating various string similarity metrics on various inputs combinations. In one embodiment, the list of metrics includes:

Street Address
    Share of common N-Grams
        various length of n-grams
    Share of common skip-grams
        various skip length as well as various length of n-grams
    Entropy metric
Separated Words of Street Address
    Jaro-Winkler distance between individual words of both addresses.
Individual Letters
    Share of common letters The vectors are then presented to a trained machine learning model. In some embodiment, the trained machine learning model is configured using CatBoost technique. Catboost comprises an ensemble of decision trees created with a boosting approach. For each vector of each candidate address of the set of candidate addresses, the trained machine learning model outputs a predicted probability that the respective candidate address and the standardized street locale represent a same place or location.

In one embodiment, the machine learning model is trained using pairs of street addresses that are labeled as matches and non-matches. Approaches for name matching are discussed in U.S. patent application Ser. No. 16/989,306, filed Aug. 10, 2020, the entire contents of which is hereby incorporated by reference as if fully set forth herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/ private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Software Overview

Figure 4:
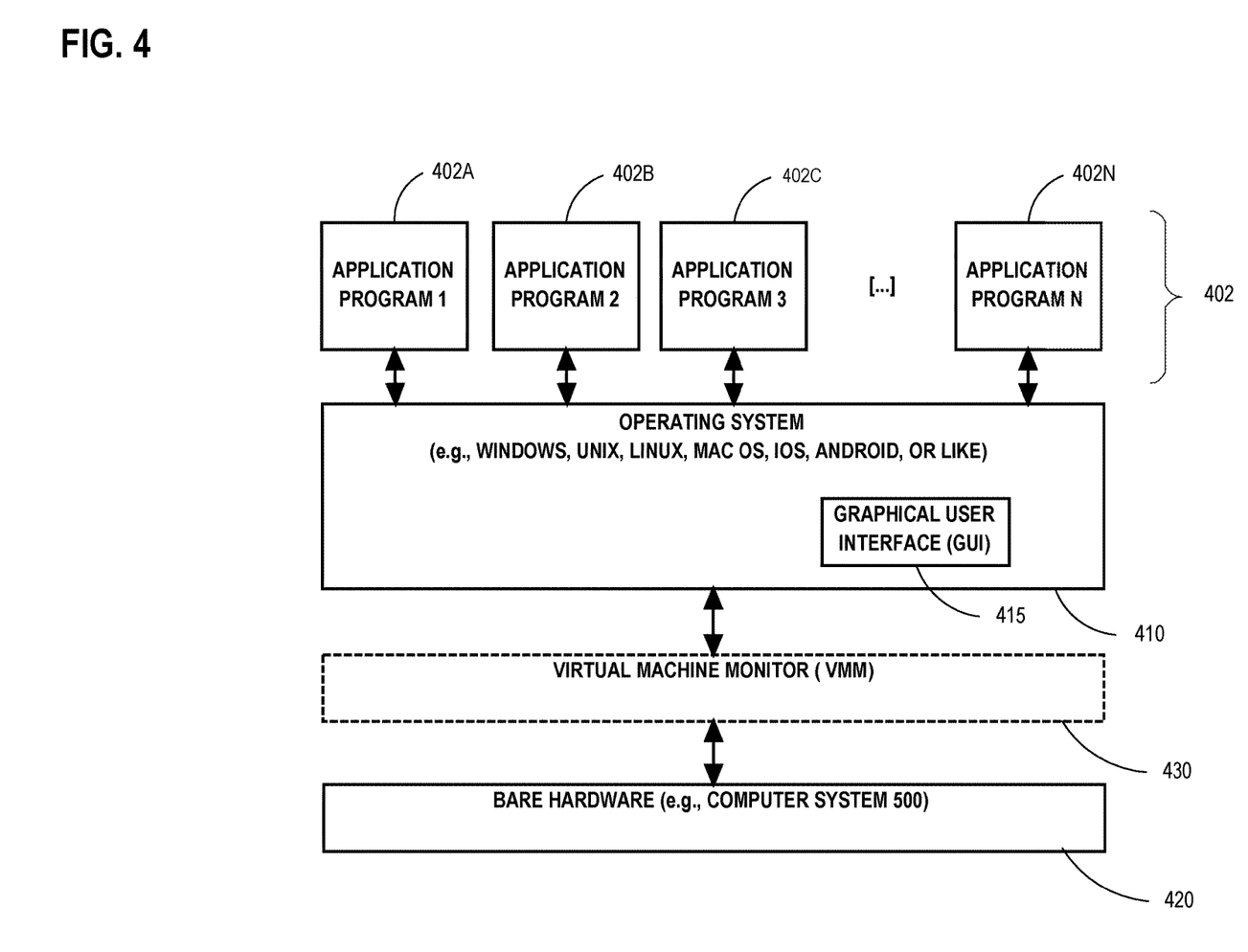
FIG. 4 is a diagram depicting a software system upon which an embodiment of the invention may be implemented.
Figure 5:
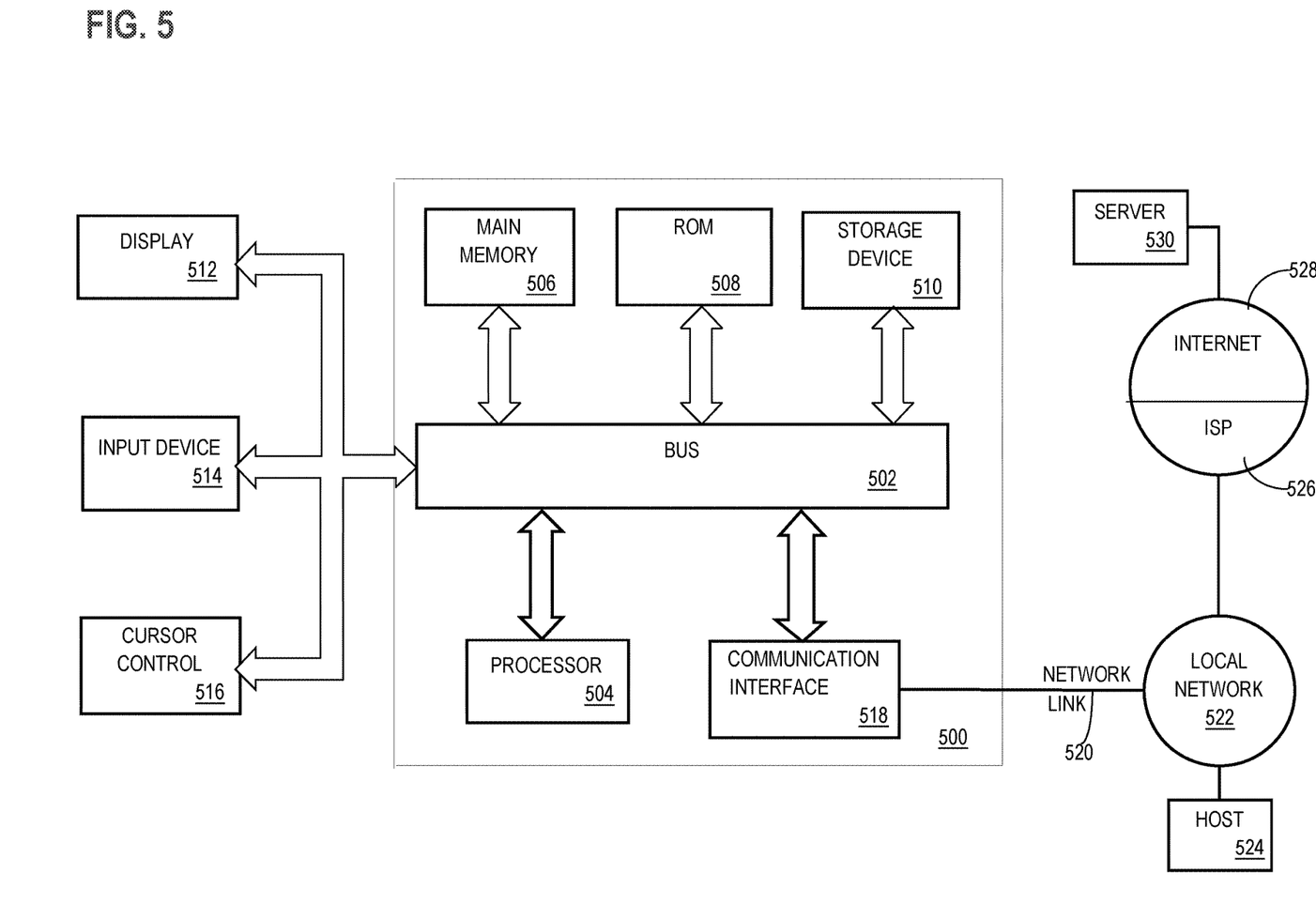
FIG. 5 is a diagram depicting a computer system that may be used in an embodiment of the present invention.

FIG. 4 is a block diagram of a basic software system 400 that may be employed for controlling the operation of computing system 500 of FIG. 5. Software system 400 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 400 is provided for directing the operation of computing system 600. Software system 400, which may be stored in system memory (RAM) 506 and on fixed storage (e.g., hard disk or flash memory) 510, includes a kernel or operating system (OS) 410.

The OS 410 manages low-level aspects of computer operation, including managing execution of processes, memory allocation, file input and output (I/O), and device I/O. One or more application programs, represented as 402A, 402B, 402C . . . 402N, may be "loaded" (e.g., transferred from fixed storage 510 into memory 506) for execution by the system 400. The applications or other software intended for use on computer system 500 may also be stored as a set of downloadable computer-executable instructions, for example, for downloading and installation from an Internet location (e.g., a Web server, an app store, or other online service).

Software system 400 includes a graphical user interface (GUI) 415, for receiving user commands and data in a graphical (e.g., "point-and-click" or "touch gesture") fashion. These inputs, in turn, may be acted upon by the system 400 in accordance with instructions from operating system 410 and/or application(s) 402. The GUI 415 also serves to display the results of operation from the OS 410 and application(s) 402, whereupon the user may supply additional inputs or terminate the session (e.g., log off).

OS 410 can execute directly on the bare hardware 420 (e.g., processor(s) 504) of computer system 500. Alternatively, a hypervisor or virtual machine monitor (VMM) 430 may be interposed between the bare hardware 420 and the OS 410. In this configuration, VMM 430 acts as a software "cushion" or virtualization layer between the OS 410 and the bare hardware 420 of the computer system 500.

VMM 430 instantiates and runs one or more virtual machine instances ("guest machines"). Each guest machine comprises a "guest" operating system, such as OS 410, and one or more applications, such as application(s) 402, designed to execute on the guest operating system. The VMM 430 presents the guest operating systems with a virtual operating platform and manages the execution of the guest operating systems.

In some instances, the VMM 430 may allow a guest operating system to run as if it is running on the bare hardware 420 of computer system 500 directly. In these instances, the same version of the guest operating system configured to execute on the bare hardware 420 directly may also execute on VMM 430 without modification or reconfiguration. In other words, VMM 430 may provide full hardware and CPU virtualization to a guest operating system in some instances.

In other instances, a guest operating system may be specially designed or configured to execute on VMM 430 for efficiency. In these instances, the guest operating system is "aware" that it executes on a virtual machine monitor. In other words, VMM 430 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Multiple threads may run within a process. Each thread also comprises an allotment of hardware processing time but share access to the memory allotted to the process. The memory is used to store content of processors between the allotments when the thread is not running. The term thread may also be used to refer to a computer system process in multiple threads are not running.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, executed, and/or as generating an output or predication, a computer system process executing a machine learning algorithm applies the model artifact against the input to generate a predicted output. A computer system process executes a machine learning algorithm by executing software configured to cause execution of the algorithm.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C #, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W is N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake a I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptrons (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Autoencoder implementation and integration techniques are taught in related U.S. patent application Ser. No. 14/558,700, entitled "AUTO-ENCODER ENHANCED SELF-DIAGNOSTIC COMPONENTS FOR MODEL MONITORING". That patent application elevates a supervised or unsupervised ANN model as a first class object that is amenable to management techniques such as monitoring and governance during model development such as during training.

Deep Context Overview

As described above, an ANN may be stateless such that timing of activation is more or less irrelevant to ANN behavior. For example, recognizing a particular letter may occur in isolation and without context. More complicated classifications may be more or less dependent upon additional contextual information. For example, the information content (i.e. complexity) of a momentary input may be less than the information content of the surrounding context. Thus, semantics may occur based on context, such as a temporal sequence across inputs or an extended pattern (e.g. compound geometry) within an input example. Various techniques have emerged that make deep learning be contextual. One general strategy is contextual encoding, which packs a stimulus input and its context (i.e. surrounding/related details) into a same (e.g. densely) encoded unit that may be applied to an ANN for analysis. One form of contextual encoding is graph embedding, which constructs and prunes (i.e. limits the extent of) a logical graph of (e.g. temporally or semantically) related events or records. The graph embedding may be used as a contextual encoding and input stimulus to an ANN.

Hidden state (i.e. memory) is a powerful ANN enhancement for (especially temporal) sequence processing. Sequencing may facilitate prediction and operational anomaly detection, which can be important techniques. A recurrent neural network (RNN) is a stateful MLP that is arranged in topological steps that may operate more or less as stages of a processing pipeline. In a folded/rolled embodiment, all of the steps have identical connection weights and may share a single one dimensional weight vector for all steps. In a recursive embodiment, there is only one step that recycles some of its output back into the one step to recursively achieve sequencing. In an unrolled/unfolded embodiment, each step may have distinct connection weights. For example, the weights of each step may occur in a respective column of a two dimensional weight matrix.

A sequence of inputs may be simultaneously or sequentially applied to respective steps of an RNN to cause analysis of the whole sequence. For each input in the sequence, the RNN predicts a next sequential input based on all previous inputs in the sequence. An RNN may predict or otherwise output almost all of the input sequence already received and also a next sequential input not yet received. Prediction of a next input by itself may be valuable. Comparison of a predicted sequence to an actually received (and applied) sequence may facilitate anomaly detection. For example, an RNN based spelling model may predict that a U follows a Q while reading a word letter by letter. If a letter actually following the Q is not a U as expected, then an anomaly is detected.

Unlike a neural layer that is composed of individual neurons, each recurrence step of an RNN may be an MLP that is composed of cells, with each cell containing a few specially arranged neurons. An RNN cell operates as a unit of memory. An RNN cell may be implemented by a long short term memory (LSTM) cell. The way LSTM arranges neurons is different from how transistors are arranged in a flip flop, but a same theme of a few control gates that are specially arranged to be stateful is a goal shared by LSTM and digital logic. For example, a neural memory cell may have an input gate, an output gate, and a forget (i.e. reset) gate. Unlike a binary circuit, the input and output gates may conduct an (e.g. unit normalized) numeric value that is retained by the cell, also as a numeric value.

An RNN has two major internal enhancements over other MLPs. The first is localized memory cells such as LSTM, which involves microscopic details. The other is cross activation of recurrence steps, which is macroscopic (i.e. gross topology). Each step receives two inputs and outputs two outputs. One input is external activation from an item in an input sequence. The other input is an output of the adjacent previous step that may embed details from some or all previous steps, which achieves sequential history (i.e. temporal context). The other output is a predicted next item in the sequence. Example mathematical formulae and techniques for RNNs and LSTM are taught in related U.S. patent application Ser. No. 15/347,501, entitled "MEMORY CELL UNIT AND RECURRENT NEURAL NETWORK INCLUDING MULTIPLE MEMORY CELL UNITS."

Sophisticated analysis may be achieved by a so-called stack of MLPs. An example stack may sandwich an RNN between an upstream encoder ANN and a downstream decoder ANN, either or both of which may be an autoencoder. The stack may have fan-in and/or fan-out between MLPs. For example, an RNN may directly activate two downstream ANNs, such as an anomaly detector and an autodecoder. The autodecoder might be present only during model training for purposes such as visibility for monitoring training or in a feedback loop for unsupervised training. RNN model training may use backpropagation through time, which is a technique that may achieve higher accuracy for an RNN model than with ordinary backpropagation. Example mathematical formulae, pseudocode, and techniques for training RNN models using backpropagation through time are taught in related WIPO patent application No. PCT/US2017/033698, entitled "MEMORY-EFFICIENT BACKPROPAGATION THROUGH TIME".

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving an address string;
   generating parsed address data based on the address string;
   wherein the parsed address data comprises a plurality of subfield values, said plurality of subfield values including at least one street-level subfield value and at least one non-street level subfield value;
   using a global toponym database, identifying a plurality of field candidates for a subset of the plurality of subfield values of the parsed address data;
   generating a plurality of address tuples based on the plurality of field candidates;
   wherein the plurality of address tuples comprises combinations of field candidates of the plurality of field candidates;
   generating a plurality of queries for the global toponym database based on the plurality of address tuples;
   providing, to the global toponym database, at least one first query of the plurality of queries corresponding to at least one first address tuple of the plurality of address tuples;
   in response to the global toponym database failing to identify a canonical street locale for the at least one first address tuple, providing, to the global toponym database, a second query of the plurality of queries corresponding to a second address tuple of the plurality of address tuples;
   receiving, from the global toponym database, one or more standardized street locales, each of said one or more standardized street locales being an actual non-street level address associated with the second address tuple;
   generating a query for a global address database to: exactly match one or more non-street-level subfield values included in a particular standardized street locale of said one or more standardized street locales and fuzzy match a street-level value of said at least one street-level subfield value, the fuzzy match excluding said one or more non-street-level subfield values;
   receiving, from the global address database, a set of candidate addresses that are identical to one of said one or more standardized street locales on a non-street level;
   generating a score for each candidate address of the set of candidate addresses, each score of said each candidate address comprising a probability that said each candidate address represent a same place or location as a combination of said at least one street level subfield and the respective standardized street locale of said each candidate address.

2. The method of claim 1, further comprising:
   generating raw parsed address data based on the address string;
   generating the parsed address data by consolidating the raw parsed address data based on one or more criteria.

3. The method of claim 2, wherein the one or more criteria define one or more canonical address subfields.

4. The method of claim 1, further comprising:
   assigning a score to each address tuple of the plurality of address tuples, wherein the score of each address tuple of the plurality of address tuples is equal to a sum of similarity scores of each subfield in the each address tuple.

5. The method of claim 4, wherein the one or more standardized street locales are identified based on the score assigned to each address tuple of the plurality of address tuples.

6. The method of claim 1, further comprising:
   assigning a score to a particular standardized street locale of said one or more standardized street locales based on the parsed address data, the plurality of field candidates, and the particular standardized street locale; and
   wherein the score of said particular standardized street locale comprises a confidence metric that indicates reliability of said particular standardized street locale.

7. The method of claim 1, wherein generating the score for each candidate address of the set of candidate addresses includes:
generating a set of vectors based on a street address of said each candidate address and the at least one street-level subfield;
wherein each vector of the set of vectors is generated by calculating one or more similarity metrics.

8. The method of claim 7, further comprising:
based on the set of vectors, using a trained machine learning model to generate the score for each candidate address of the set of candidate addresses.

9. The method of claim 8, wherein the trained machine learning model is trained using a training set comprising pairs of street addresses that are labeled as matches or non-matches.

10. The method of claim 8, wherein the trained machine learning model is configured using CatBoost.

11. One or more non-transitory computer-readable media storing one or more sequences of instructions which, when executed by one or more processors, cause:
receiving an address string;
generating parsed address data based on the address string;
wherein the parsed address data comprises a plurality of subfield values, said plurality of subfield values including at least one street-level subfield value and at least one non-street level subfield value;
using a global toponym database, identifying a plurality of field candidates for a subset of the plurality of subfield values of the parsed address data;
generating a plurality of address tuples based on the plurality of field candidates;
wherein the plurality of address tuples comprises combinations of field candidates of the plurality of field candidates;
generating a plurality of queries for the global toponym database based on the plurality of address tuples;
providing, to the global toponym database, at least one first query of the plurality of queries corresponding to at least one first address tuple of the plurality of address tuples;
in response to the global toponym database failing to identify a canonical street locale for the at least one first address tuple, providing, to the global toponym database, a second query of the plurality of queries corresponding to a second address tuple of the plurality of address tuples;
receiving, from the global toponym database, one or more standardized street locales, each of said one or more standardized street locales being an actual non-street level address associated with the second address tuple;
generating a query for a global address database to: exactly match one or more non-street-level subfield values included in a particular standardized street locale of said one or more standardized street locales and fuzzy match a street-level value of said at least one street-level subfield value, the fuzzy match excluding said one or more non-street-level subfield values;
receiving, from the global address database, a set of candidate addresses that are identical to one of said one or more standardized street locales on a non-street level;
generating a score for each candidate address of the set of candidate addresses, each score of said each candidate address comprising a probability that said each candidate address represent a same place or location as a combination of said at least one street level subfield and the respective standardized street locale of said each candidate address.

12. The one or more non-transitory computer-readable media of claim 11, wherein the one or more sequences of instructions include instructions that, when executed by said one or more processors, cause:
generating raw parsed address data based on the address string;
generating the parsed address data by consolidating the raw parsed address data based on one or more criteria.

13. The one or more non-transitory computer-readable media of claim 12, wherein the one or more criteria define one or more canonical address subfields.

14. The one or more non-transitory computer-readable media of claim 11, wherein the one or more sequences of instructions include instructions that, when executed by said one or more processors, cause:
assigning a score to each address tuple of the plurality of address tuples, wherein the score of each address tuple of the plurality of address tuples is equal to a sum of similarity scores of each subfield in the each address tuple.

15. The one or more non-transitory computer-readable media of claim 14, wherein the one or more standardized street locales are identified based on the score assigned to each address tuple of the plurality of address tuples.

16. The one or more non-transitory computer-readable media of claim 11, wherein the one or more sequences of instructions include instructions that, when executed by said one or more processors, cause:
assigning a score to a particular standardized street locale of said one or more standardized street locales based on the parsed address data, the plurality of field candidates, and the particular standardized street locale; and
wherein the score of said particular standardized street locale comprises a confidence metric that indicates reliability of said particular standardized street locale.

17. The one or more non-transitory computer-readable media of claim 11, wherein generating the score for each candidate address of the set of candidate addresses includes:
generating a set of vectors based on a street address of said each candidate address and the at least one street-level subfield;
wherein each vector of the set of vectors is generated by calculating one or more similarity metrics.

18. The one or more non-transitory computer-readable media of claim 17, wherein the one or more sequences of instructions include instructions that, when executed by said one or more processors, cause:
based on the set of vectors, using a trained machine learning model to generate the score for each candidate address of the set of candidate addresses.

19. The one or more non-transitory computer-readable media of claim 18, wherein the trained machine learning model is trained using a training set comprising pairs of street addresses that are labeled as matches or non-matches.

20. The one or more non-transitory computer-readable media of claim 18, wherein the trained machine learning model is configured using CatBoost.

* * * * *